United States Patent
Biaujaud et al.

(10) Patent No.: US 11,025,048 B2
(45) Date of Patent: Jun. 1, 2021

(54) SYSTEM FOR DETECTING AND LIMITING THE EFFECTS OF LOSS OF INSULATION OF AN ELECTRICAL TRANSFORMER

(71) Applicant: THALES, Courbevoie (FR)

(72) Inventors: Rémy Biaujaud, Chatou (FR); Mathieu Mairie, Chatou (FR); Prithu Mariadassou, Chatou (FR); Frédéric Lacaux, Chatou (FR); Francis Abdesselam, Chatou (FR)

(73) Assignee: THALES, Courbevoie (FR)

( * ) Notice: Subject to any disclaimer, the term of this patent is extended or adjusted under 35 U.S.C. 154(b) by 89 days.

(21) Appl. No.: 16/669,224

(22) Filed: Oct. 30, 2019

(65) Prior Publication Data

US 2020/0153229 A1 May 14, 2020

(30) Foreign Application Priority Data

Nov. 8, 2018 (FR) ...................................... 1871454

(51) Int. Cl.
*H02H 3/00* (2006.01)
*H02H 3/08* (2006.01)
(Continued)

(52) U.S. Cl.
CPC ........... *H02H 3/085* (2013.01); *H01F 27/288* (2013.01); *H01F 27/34* (2013.01); *H01F 27/402* (2013.01);
(Continued)

(58) Field of Classification Search
CPC .... H02H 3/085; H02H 1/0007; H01F 27/288; H01F 27/34; H01F 27/402; H01F 2027/406
(Continued)

(56) References Cited

U.S. PATENT DOCUMENTS

| | | | | |
|---|---|---|---|---|
| 2002/0140536 A1* | 10/2002 | Hopkinson | ........... | H01F 27/402 336/181 |
| 2015/0109090 A1 | 4/2015 | Patel | | |
| 2018/0034372 A1* | 2/2018 | Jacobson | ................ | H01F 27/36 |

FOREIGN PATENT DOCUMENTS

| | | |
|---|---|---|
| EP | 0 817 346 A1 | 1/1998 |
| EP | 0 981 140 A1 | 2/2000 |

(Continued)

*Primary Examiner* — Thienvu V Tran
*Assistant Examiner* — Sreeya Sreevatsa
(74) *Attorney, Agent, or Firm* — BakerHostetler

(57) ABSTRACT

An electrical transformer includes a first winding, called primary, at least one second winding, called secondary, switches, and a current detection system, wherein it comprises at least one metal screen having a connection point linked to a neutral potential of the primary winding or intended to be linked to an electrical ground and placed between the primary winding and the at least one secondary winding, the screen being made of an electrically conductive material having a melting point higher than that of the materials constituting the windings; in that the primary winding comprises an input intended to be linked to an external energy source, the switches are placed at the input of the primary winding so as to be able to isolate the primary winding from the external energy source and in that the current detection system is configured to detect a current at the input of the primary winding or a current at the connection point and to close or open the switches based on the detection of the current, the detection system being differential or thermal.

11 Claims, 4 Drawing Sheets

(51) Int. Cl.
   *H01F 27/28* (2006.01)
   *H01F 27/34* (2006.01)
   *H01F 27/40* (2006.01)
   *H02H 1/00* (2006.01)
(52) U.S. Cl.
   CPC ..... *H02H 1/0007* (2013.01); *H01F 2027/406* (2013.01)
(58) Field of Classification Search
   USPC .......................................................... 361/87
   See application file for complete search history.

(56) References Cited

FOREIGN PATENT DOCUMENTS

EP          2 075 806 A1     7/2009
EP          2 487 697 A1     8/2012

* cited by examiner

SYSTEM FOR DETECTING AND LIMITING THE EFFECTS OF LOSS OF INSULATION OF AN ELECTRICAL TRANSFORMER

CROSS-REFERENCE TO RELATED APPLICATIONS

This application claims priority to foreign French patent application No. FR 1871454, filed on Nov. 8, 2018, the disclosure of which is incorporated by reference in its entirety.

FIELD OF THE INVENTION

The invention relates to a system for detecting and limiting the effects of loss of insulation of an electrical transformer in a critical environment in which an insulation breakdown of a transformer can present a risk for the people and the installations.

BACKGROUND

A transformer makes it possible to convert an alternating electrical energy source into magnetic energy and vice versa, the converted energy being of the same frequency as the energy of the initial source. It is composed of primary and secondary windings which have no electrical link between them, only a magnetic coupling. It is supplied by one or more alternating voltages, called phases, each via a primary winding which constitutes an input of the transformer. One or more secondary windings constitute the outputs of the transformer. A set of primary and secondary windings dependent on one and the same input voltage is called coil. There are therefore as many coils as there are phases of the input of the transformer. The transformer makes it possible to exchange energy between the primary windings and the secondary windings without them exchanging electrons by virtue of the magnetic coupling. The passage through a magnetic medium makes it possible to create a galvanic insulation between the electrical energy passing through the primary winding and the electrical energy passing through the secondary winding, and to raise or lower the amplitudes of the voltages or currents entering into the primary winding and exiting from the secondary winding through the transformer-turns ratio of the transformer. It can also supply the same voltage or current level between the input and the output of the transformer and simply serve as galvanic insulation.

However, if this galvanic insulation disappears, there is insulation breakdown, the electrons can circulate from the primary winding to the secondary winding and the transformer-turns ratio of the transformer is no longer guaranteed. Thus, the voltage of the secondary winding can, for example, in the case of a voltage set-down transformer, rise above the voltage for which the equipment, connected to the transformer, is designed and lead to the destruction thereof.

Furthermore, the insulation breakdown can be sudden and undetectable, and in the current transformers, used for example in aeronautics, it can instantaneously generate "a dreaded failure mode", such as the increasing of the voltage in the secondary windings. Following a change to the protection standards, this problem is recent in aeronautics and there is currently no solution that makes it possible to slow down and detect this insulation defect. Hitherto, this defect was accepted from a safety point of view, but it is now considered catastrophic. That means that this insulation defect is tolerated only if it appears only after a minimum of two independent failures, that is to say appears for example after a failure of the winding of the transformer and a failure of the control of the power supply of the transformer.

In order to the limit the appearance of the defect of loss of insulation, it is possible to take precautions in production (inspection of the production steps, cleanliness of production, etc.) and to insert one or more layers of thermal insulation, of Kapton or Nomex type, between the secondary and primary windings. That makes it possible to slow down the heating effects linked to the defect of loss of insulation. Nevertheless, if this defect occurs, these solutions are not capable of slowing it down sufficiently to avoid it being propagated to all the windings, because the layers of insulations will be perforated and/or melt. Furthermore, no detection of this defect will be possible with these passive solutions to cut the electrical power supply of the failing transformer before hazardous voltages and/or currents are propagated to the equipment which is connected to it.

SUMMARY OF THE INVENTION

The invention aims to overcome the abovementioned drawbacks and limitations of the prior art. More specifically, it aims to slow down the effect of a winding failure for this failure not to be immediately transformed into an insulation breakdown, and to put in place a detection means allowing a current breaking unit to isolate the transformer from its electrical energy source.

A subject of the invention is therefore a magnetic coil comprising a first winding, called primary; and at least one second winding, called secondary (S), characterized in that it also comprises at least one metal screen, placed between the primary winding and the secondary winding, the screen being made of an electrically conductive material having a melting point higher than that of the materials constituting the primary winding and the secondary winding.

According to embodiments of the invention:

The magnetic coil comprises two secondary windings and two metal screens, a first of the two screens is placed between a first of the two secondary windings and the primary winding and the second of the two screens is placed between the primary winding and the second of the two secondary windings, the two screens being made of an electrically conductive material having a melting point higher than that of the materials constituting the primary winding and the secondary windings;

the screen and the primary and secondary windings are concentric;

the primary and secondary windings are juxtaposed on a surface parallel to a longitudinal axis of the coil, the screen being at right angles to this surface;

the primary winding and the secondary winding are made of aluminium alloy and the screen is made of copper alloy;

the magnetic coil also comprises a first layer of thermal insulation, inserted between the primary winding and the screen, and a second layer of thermal insulation, inserted between the screen and the secondary winding, the materials constituting the first and the second layers of thermal insulation being resistant to a temperature higher than 400° C.;

the two layers of thermal insulation (I1, I2) are based on polyimide and aramid;

a thickness of a stack of layers comprising the two layers of thermal insulation and the screen is between 0.60 mm and 1 mm.

Another subject of the invention is an electrical transformer comprising at least two magnetic coils according to the invention, in which the metal screens of the coils are linked electrically in series or in parallel.

According to embodiments of the invention:

The screens are linked electrically to one another and at least one of the screens is linked directly without passing through the other screens electrically to an electrical ground or to a neutral potential of the primary winding;

at least one of the screens comprises two connections fixed to the screen and at a distance from one another, a first of the two connections being linked to another of the screens, a second of the two connections being linked either to yet another of the screens, or to an electrical ground or to a neutral potential of the primary winding, and in this case the electrical connection can comprise at least one conductive bar placed in electrical contact with at least one screen; and the primary windings comprise an input linked to an external energy source, switches placed at the inputs of the primary windings so as to be able to isolate the primary windings from the external energy source and a current detection system detecting the current at the input of the primary windings or the current at the electrical ground and able to close or open the switches, the detection system being differential or thermal.

BRIEF DESCRIPTION OF THE DRAWINGS

Other features, details and advantages of the invention will emerge on reading the description given with reference to the attached figures given by way of example and which represent, respectively.

DETAILED DESCRIPTION

Figure 1:
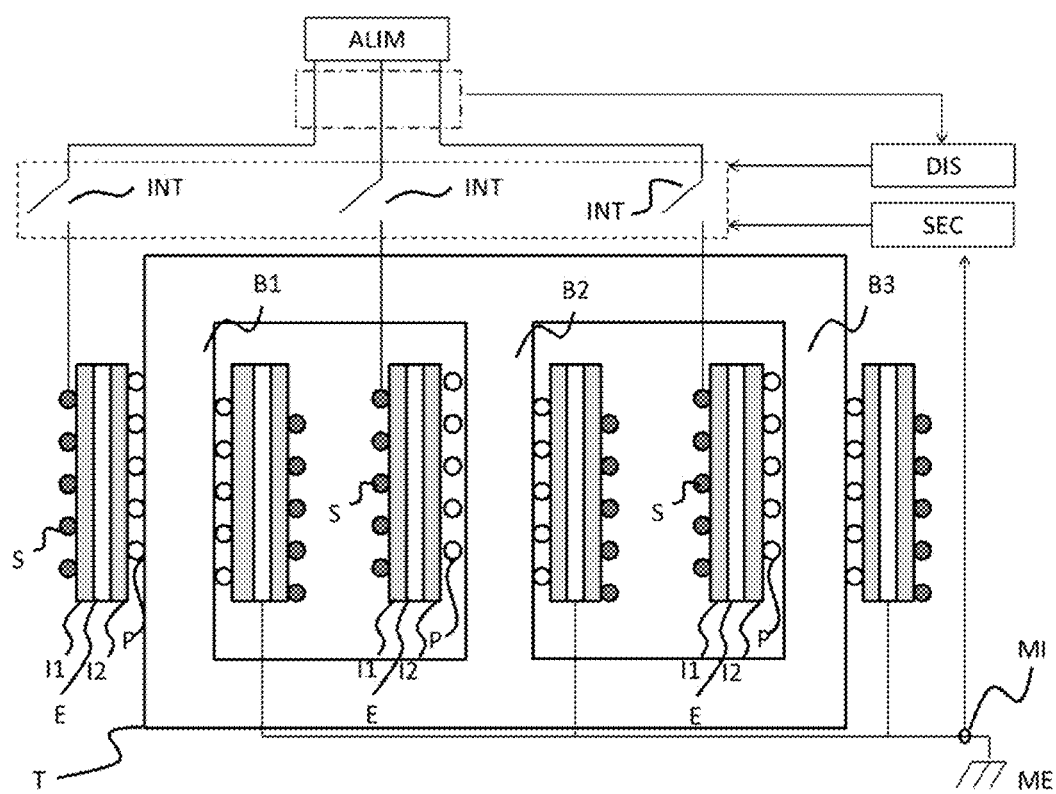
FIG. 1, a cross section of a transformer according to a first embodiment of the invention.

FIG. 1 presents a cross section of a transformer T according to a first embodiment of the invention. The transformer T is three-phase and it therefore comprises three coils B1, B2 and B3. Each of the coils B1, B2 and B3 comprises a secondary winding S, a primary winding P and a metal screen E. In this first embodiment, the screen E and the primary P and secondary S windings are concentric and the screen E is inserted between two windings P and S.

In order to withstand high temperatures for a longer time, and therefore avoid the insulation breakdown between the primary P and secondary S windings, the metal screen E is made of a conductive material having a melting point higher than that of the materials constituting the primary P and secondary S windings.

An external energy source ALIM, linked to the inputs of the transformer T, that is to say to the inputs of the primary windings P, makes it possible to supply the transformer T. Switches INT are placed at the inputs of the primary windings P in order to be able to control the power supply of the transformer T.

The screens E are linked together in parallel to the electrical ground ME. A cable links for example the screens E to one another or a copper bar brazed onto each of the outputs of the screens E and linked to the ground ME makes it possible for example to produce the parallel connection of the screens E.

It is possible to add a current detection system DIS which makes it possible to measure the currents and to control the opening and the closing of the switches INT according to the measured current values. The system DIS is for example a differential detection system which will compare the current values at the input of the primary windings P or compare, as a function of time, the current values at the input of at least one primary winding. If the current values detected are different, the system will open the switches INT in order to cut the power supply of the transformer.

The system DIS can also be a thermal detection system which will open the switches INT when the current detected at the input of the primary windings P has reached a given intensity value for a certain time, which is equivalent to an overheating. This type of thermal detection system is, for example, a fuse or bimetallic strip detector. The system DIS can, more particularly, be a magneto-thermal circuit breaker containing bimetallic strips which will be tripped in dead short-circuit cases.

A differential detection system SEC can also be present to detect the current arriving at the ground ME and coming from the screens E (for example at the point MI in FIG. 1), compare the detected current as a function of time and act on the opening and the closing of the switches INT.

In order to protect the screen E from an electrical arc and/or from a high rise in temperature, for example following a short-circuit, the metal screen E can be surrounded by two thermal insulations I1 and I2. The two layers of thermal insulation I1 and I2 are made of a material that can withstand temperatures higher than 400° C., advantageously they can withstand temperatures of 500 to 600° C.

Thus, if an electrical arc occurs and is propagated from the primary winding P to the secondary winding S (or from the secondary winding S to the primary winding P) of one of the coils B1, B2 or B3, the electrical arc will be channelled by the insulations I1 or I2. That will cause the arc to be formed only between the primary P or secondary S windings and the insulations I1 or I2, and not between the primary P or secondary S windings and one of the metal screens E and to be evacuated out of the windings through the insulations I1 and I2. If an arc is formed even so between one of the windings and the screens E, that is to say there is contact between the secondary S or primary P winding and the screen E (for example because the insulation is perforated or because the arc is connected to the plank of the coil), then the voltage source that has given rise to this arc will be linked to the electrical ground ME via the screen E. A fault current, called leakage current, will then appear and circulate to the ground ME and will be detected by one of the current detection systems DIS or SEC. The system DIS or SEC will then cut the electrical power supply of the windings by opening the switches INT before the electrical arc is propagated further to the point of melting the windings or creating an electrical link between the primary winding P and the secondary winding S.

If a thermal runaway occurs, for example following a short-circuiting of several turns of the coils B1, B2 or B3, the insulations I1 and I2 will delay the propagation of the heat to the primary winding P (or secondary winding S depending on the location of this fault). The propagation will be delayed until:

Either the provoked short-circuit generates an excessive consumption at the input of the equipment, that is to say at the input of the transformer T, and in this case, the thermal current detection system is tripped and isolates the equipment from the power supply ALIM by opening the switches INT;

or the temperature reached is so high that the heat passes through the insulation I1 or I2 and reaches the screen E which, for its part, will not be destroyed because its melting point is higher than that of the primary and secondary windings (indeed, if the screen E melts, that means that the windings have already melted and therefore that the transformer is already destroyed, but with such an energy level, the protection device DIS or SEC will already be tripped). Since the screen E is linked to the ground ME, a leakage current will appear and therefore the differential current detection system will isolate the defective equipment.

It is therefore possible to slow down the propagation of the dreaded fault, that is to say the insulation breakdown, by ensuring the detection, via external protection systems, of the excessively high proximity between high and low voltage risking very rapidly leading to the loss of insulation and by cutting the electrical power supply of the faulty transformer.

In order to be able to withstand high leakage currents, the electrical link linking the screens E to the ground ME is set up with cables of sufficient section and terminals dimensioned to support this current.

This thickness of the screen E must be sufficient for a failure of the winding not to destroy the screen. This thickness depends on the environment in which the transformer T evolves and the power of the transformer T. The thickness of the screen E can be validated by tests.

According to another embodiment, the screens are not linked directly to the ground ME. They can be linked to the negative terminal of the transformer T or to the negative terminal of the equipment connected to the transformer T or be linked to a dedicated connector and then linked to an electrical ground outside the equipment.

According to another embodiment, the screens E are connected to a neutral electrical potential of the primary winding P.

According to another embodiment, a second secondary winding can be present on the coils B1, B2 and B3. If the first and the second secondary windings are such that the primary winding is surrounded on either side by one of the secondary windings, then a second metal screen makes it possible to separate this second secondary winding from the primary winding. This second secondary winding and this second metal screen can also be present in the embodiments of FIGS. 1 and 2.

More generally, there will be as many metal screens as there are primary winding/secondary winding interfaces.

According to another embodiment, the insulations I1 and I2 are based on polyimide and aramid, more particularly based on Nomex and Kapton, and even more particularly, they are made of Trivoltherm (material marketed by the company KREMPEL GmbH).

One exemplary implementation is a screen E made of copper (melting point of 1045° C.) of 0.2 mm thickness surrounded by two layers of thermal insulation made of Trivoltherm 0.2 mm thick. The primary P and secondary S windings are made of aluminium sheet (melting point of 648° C.) between 0.1 mm and 0.4 mm thick.

Figure 2:
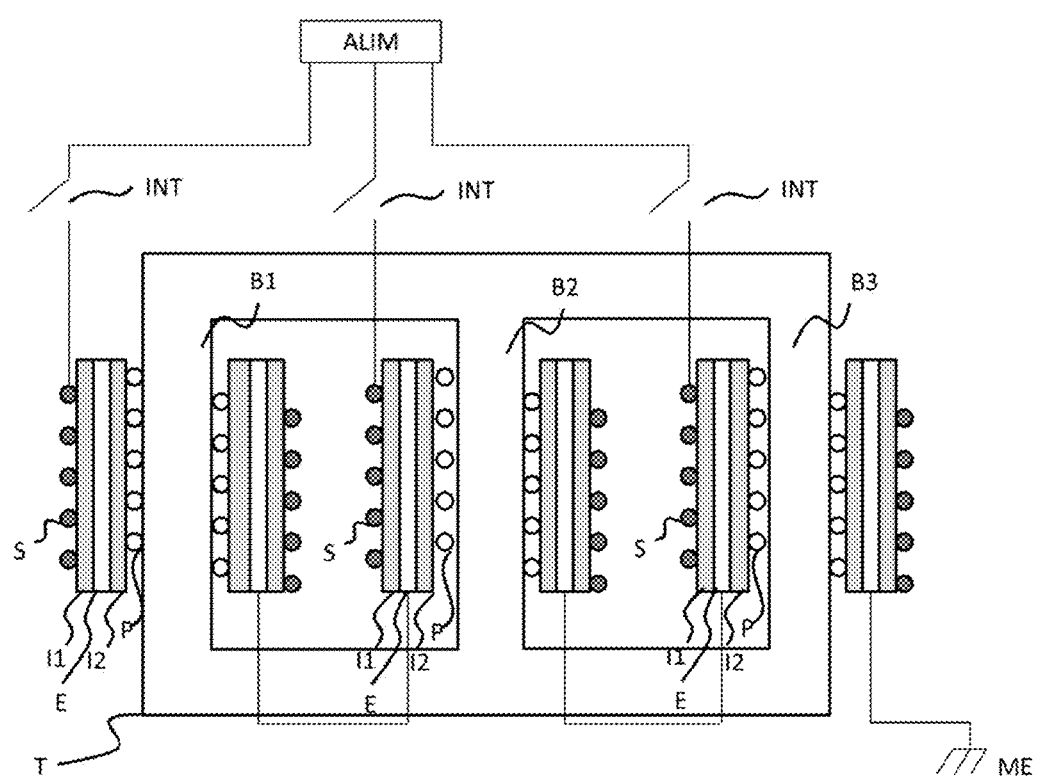
FIG. 2, a cross section of an electrical transformer according to a second embodiment of the invention.

FIG. 2 presents a cross-section of a transformer according to a second embodiment of the invention, in which the screens E are linked to one another in series. In this embodiment, the screens have two outputs to be able to be placed in series with one another. The benefit of placing them in series is to be able to perform internal continuity measurements in the equipment to check the correct connection of the screens E into one another and the correct connection of the screens E with the electrical ground ME or with the neutral potential of the primary winding P or even with the negative terminal of the equipment. In addition, the screens can be placed in series by electrical connections having a current input and output produced on one and the same support or on distinct supports (FIGS. 3a and 3b).

Figure 3A:
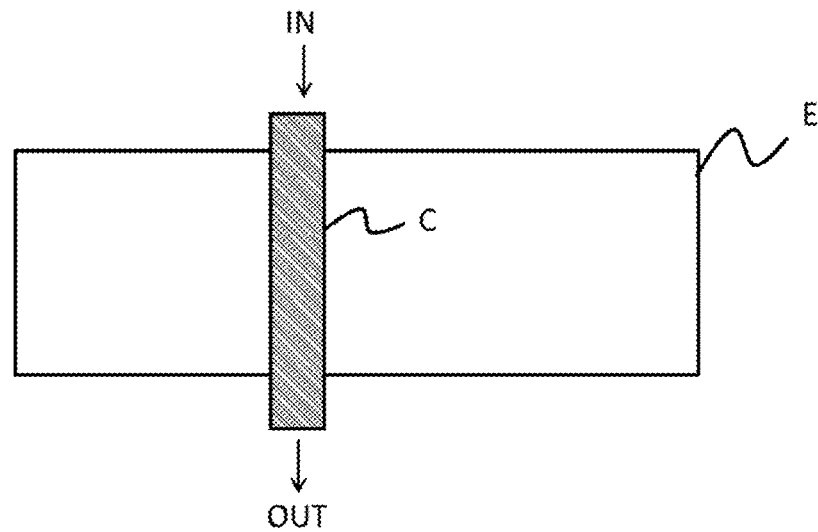
FIGS. 3a and 3b, a view of the screen of the transformer according to, respectively, a third embodiment and a fourth embodiment of the invention.
Figure 3B:
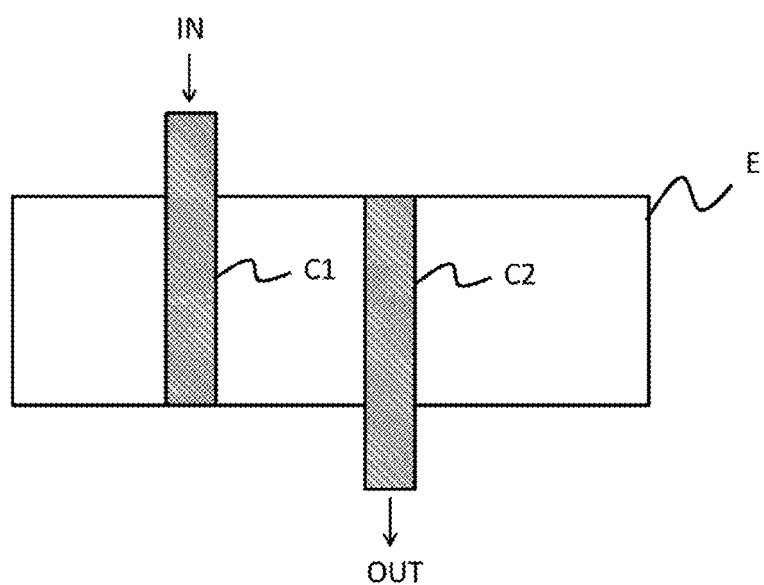

FIGS. 3a and 3b respectively present a view of the screen E according to a fourth embodiment and a fifth embodiment.

FIG. 3a notably presents a view of the screen E unfolded in which the electrical connection linking the screens E comprises a current input IN and current output OUT produced on one and the same support C. The support C is conductive and is in electrical contact with the screen E. Therefore, if a connection fault between the screen E and the support C occurs, the current will nevertheless be able to circulate in the support C between the input IN and the output OUT of the electrical connection between the screens E, therefore it will not be possible to know if the fault detected by the current measurements comes from a fault of the screen E or from a fault between the support C and the screen E.

FIG. 3b presents a view of the screen E unfolded in which the current input IN and current output OUT are produced on distinct supports. The screen therefore has a first support C1 for the input IN and a second support C2 for the output OUT. The supports C1 and C2 are conductive and in electrical contact with the screen E. The two supports C1 and C2 can be placed alongside one another or 180° opposite when the screen E is wound around the coil. It is also possible to have the input IN and the output OUT opposite, as is the case in FIG. 3b or on the same side. If one of the supports C1 or C2 has a connection fault with the screen E, for example the support C1 or C2 is no longer in electrical contact with the screen E, the current will not be able to circulate between the input IN and the output OUT and it will therefore be possible to detect this fault unlike the connection using a single support for the current input IN and output OUT.

As previously, differential and/or thermal current detection systems can be used to detect the currents at the input of the primary windings or at the ground ME in order to cut the power supply of the transformer T in case of failure.

Figure 4A:
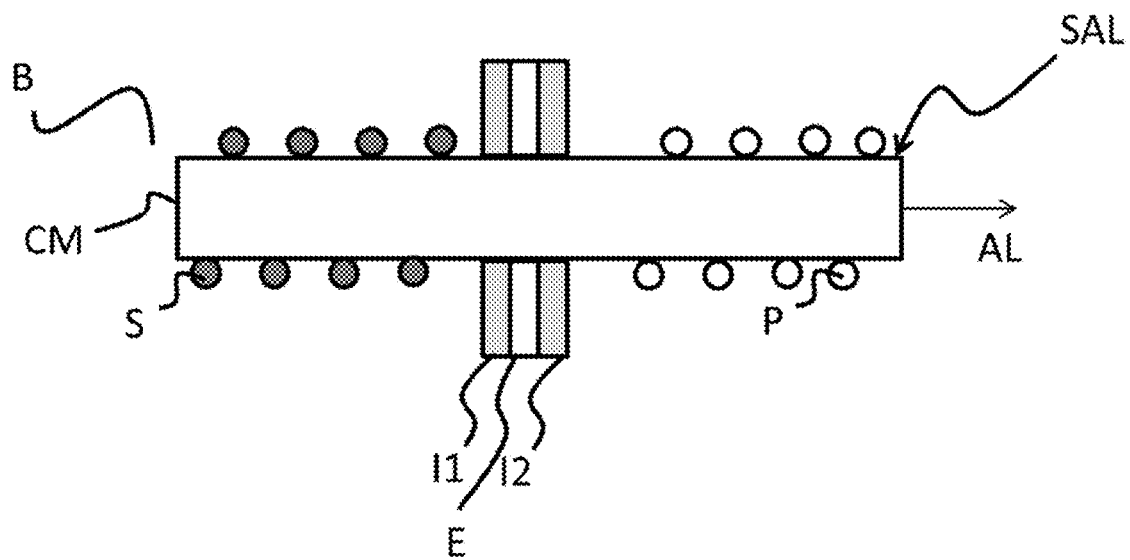
FIGS. 4a and 4b, a cross section of a coil according to, respectively, a fifth embodiment and a sixth embodiment of the invention.
Figure 4B:
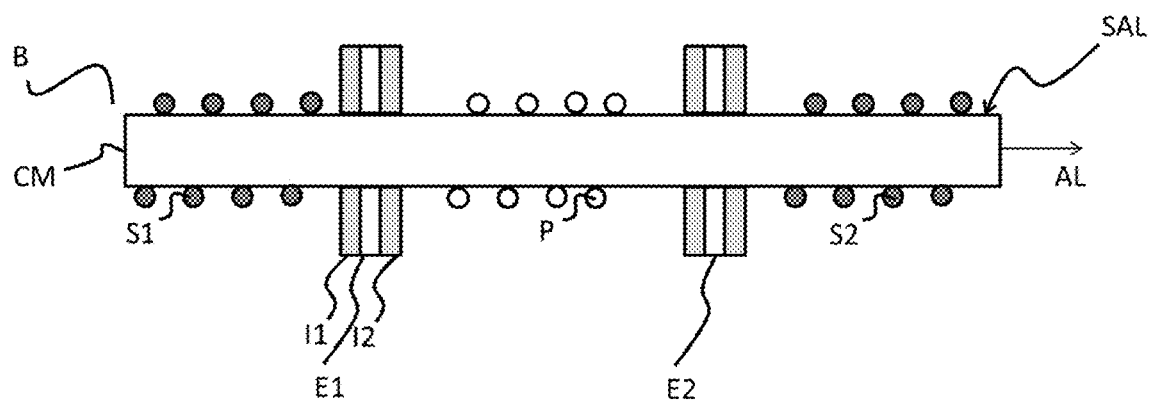

FIGS. 4a and 4b respectively present a coil B according to a fifth embodiment and a sixth embodiment of the invention. In these two figures, the primary P and secondary S windings are juxtaposed on a surface parallel to the longitudinal axis AL of the coil B. In other words, the primary P and secondary S windings are wound along the same axis AL and are placed alongside one another on this axis AL. The screens E, E1 and E2 are partitions at right angles to this surface and therefore at right angles to the magnetic circuit CM of the coil B and at right angles to the axis AL. The magnetic screens E, E1 and E2 always separate the secondary windings from the primary winding and can be surrounded by two layers of thermal insulation I1 and I2.

In FIG. 4a, the secondary windings are all placed on one and the same side of the screen E and the primary winding P is placed on the other side, whereas, in FIG. 4b, the primary winding P surrounded by two metal screens E1 and E2 separates two secondary windings S1 and S2.

The invention claimed is:

1. An electrical transformer comprising:
   a primary winding;
   at least one secondary winding;
   a plurality of switches;
   a current detection system; and
   at least one metal screen having a connection point linked to a neutral potential of the primary winding or linked to an electrical ground and placed between the primary winding and the at least one secondary winding, the screen being made of an electrically conductive material having a melting point higher than that of the materials constituting the primary winding and the at least one secondary winding,
   wherein the primary winding comprises an input linked to an external energy source, the switches are placed at the input of the primary winding so as to be able to isolate the primary winding from the external energy source and wherein the current detection system is configured to detect a current at the input of the primary winding or a current at the connection point and is configured to close or open the switches based on the detection of the current, the detection system being differential or thermal.

2. The electrical transformer according to claim 1, wherein the screen and the primary and secondary windings are concentric.

3. The electrical transformer according to claim 1, wherein the primary and secondary windings are wound along a single axis and the screen is at right angles to this same axis.

4. The electrical transformer according to claim 1, wherein the primary and secondary windings are made of aluminium alloy and the screen is made of copper alloy.

5. The electrical transformer according to claim 1, also comprising a first layer of thermal insulation, inserted between the primary winding and the screen, and a second layer of thermal insulation, inserted between the screen and the at least one secondary winding, the materials constituting the first and the second layers of thermal insulation being resistant to a temperature higher than 400° C.

6. The electrical transformer according to claim 5, wherein the two layers of thermal insulation are based on polyimide and aramid.

7. The electrical transformer according to claim 5, wherein a thickness of a stack of layers comprising the two layers of thermal insulation and the screen is between 0.60 mm and 1 mm.

8. The electrical transformer according to claim 1, comprising two secondary windings and two metal screens, a first of the two screens is placed between a first of the two secondary windings and the primary winding and a second of the two screens is placed between the primary winding and a second of the two secondary windings, the two screens being linked electrically in series or in parallel.

9. The electrical transformer according to claim 8, wherein the screens are linked electrically to one another and at least the connection point of one of the screens is intended to be linked directly without passing through the other screens electrically to the electrical ground or is linked to the neutral potential of the primary winding.

10. The electrical transformer according to claim 9, wherein at least one of the screens comprises two connections fixed to the screen and at a distance from one another, a first of the two connections being linked to another of the screens, a second of the two connections being linked either to yet another of the screens, or to a neutral potential of the primary winding, or is intended to be linked to an electrical ground.

11. The electrical transformer according to claim 10, wherein the electrical connection comprises at least one conductive bar placed in electrical contact with at least one screen.

* * * * *